Figure 2:
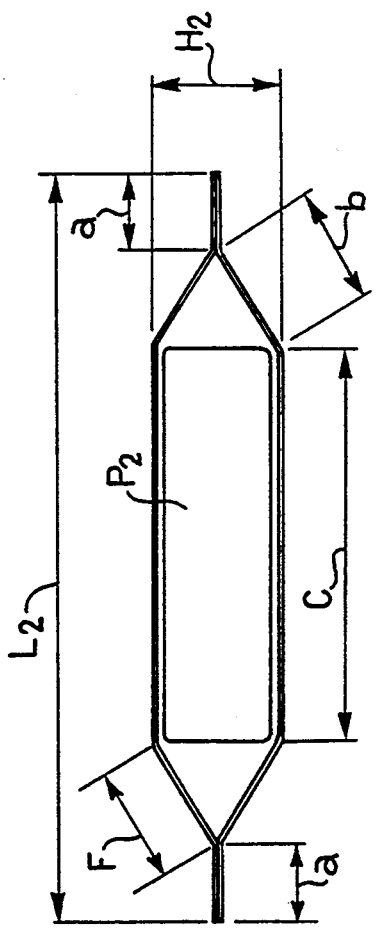

United States Patent [19]

Francioni

[11] Patent Number: 5,351,464
[45] Date of Patent: Oct. 4, 1994

[54] PACKAGING MACHINE, PARTICULARLY FOR FORMING FLOW-PACK WRAPPERS AND THE LIKE AND A METHOD OF OPERATING THE MACHINE

[75] Inventor: Renzo Francioni, Prato Sesia, Italy

[73] Assignee: Cavanna S.P.A., Prato Seaia, Italy

[21] Appl. No.: 984,994

[22] Filed: Dec. 2, 1992

[30] Foreign Application Priority Data

Dec. 4, 1991 [IT] Italy ................. TO91 A 000940

[51] Int. Cl.$^5$ ............................................... B65B 9/00
[52] U.S. Cl. ........................................ 53/450; 53/55;
53/75; 53/550
[58] Field of Search ............ 53/55, 64, 75, 450,
53/493, 498, 500, 504, 550, 459

[56] References Cited

U.S. PATENT DOCUMENTS

| | | | |
|---|---|---|---|
| 2,280,405 | 4/1942 | Frostad | 53/550 |
| 3,007,295 | 11/1961 | Heinzen | 53/550 |
| 3,241,288 | 3/1966 | Molins | 53/550 |
| 4,106,265 | 8/1978 | Aterianus | 53/550 |
| 4,574,566 | 3/1986 | Eaves et al. | 53/55 |
| 4,722,168 | 2/1988 | Heaney | 53/55 |
| 4,862,673 | 9/1989 | Francioni | 53/550 |
| 4,924,657 | 5/1990 | Berti et al. | 53/450 |

FOREIGN PATENT DOCUMENTS 2220167 1/1990 United Kingdom .
2226523 7/1990 United Kingdom .

*Primary Examiner*—W. Donald Bray
*Attorney, Agent, or Firm*—Knobbe, Martens, Olson & Bear

[57] ABSTRACT

In a packaging machine in which products to be packaged are inserted in a tubular wrapper which is then closed by two closure units in cascade, a dimensional characteristic of the products, such as their heights, variations of which can cause corresponding variations in the overall lengths of the packages formed by the tubular wrappers, is monitored in order to bring about corresponding variations in the phase difference in the operation of the closure units.

18 Claims, 4 Drawing Sheets

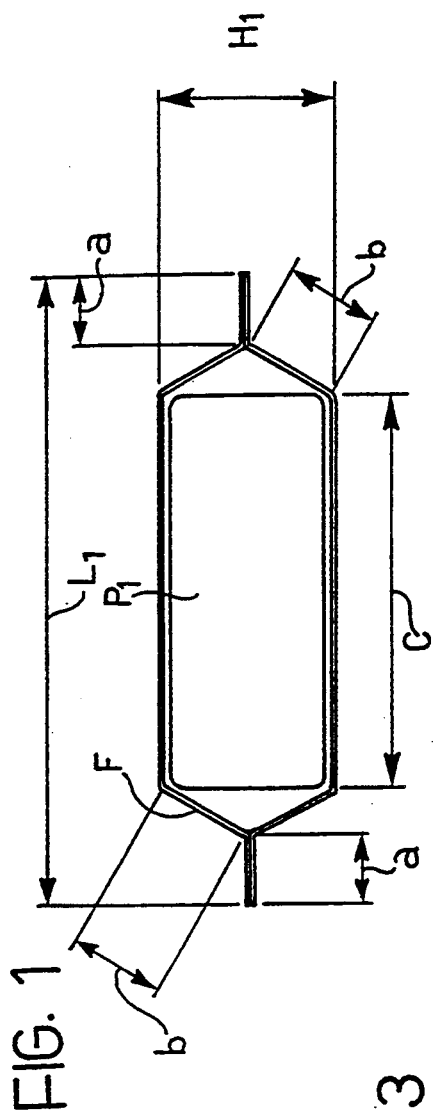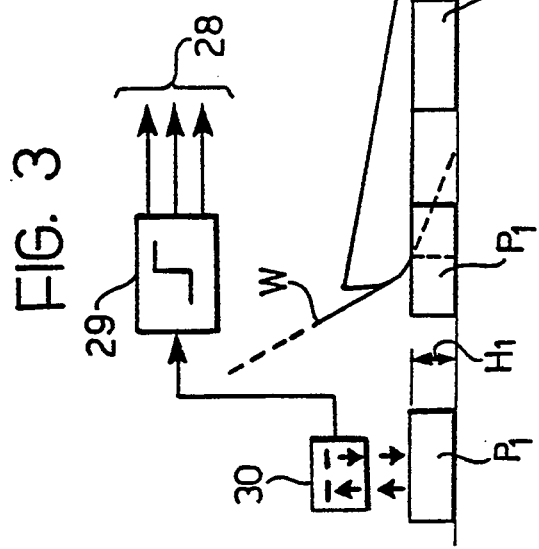

PACKAGING MACHINE, PARTICULARLY FOR FORMING FLOW-PACK WRAPPERS AND THE LIKE AND A METHOD OF OPERATING THE MACHINE

DESCRIPTION

The present invention relates to packaging machines and, in particular, to packaging machines which can form wrappers of the type currently known as "flow-packs", "form-fill-seal" packs, or simply "ffs" packs.

The invention relates specifically to packaging machines in which the products to be packaged are inserted in a tubular wrapper which is then closed by at least two closure units disposed in cascade in the general direction in which the products advance. The upstream closure unit has the function of closing the tubular wrapper, forming closure (seal) regions which separate successive products being packaged, and the downstream unit strengthens the seals further and also cuts the wrapper so as to separate the successive packages formed.

Packaging machines of this type are widely known in the art, for example, from the present Applicant's U.S. Pat. No. 4 862 673. Substantially analogous or similar technical solutions are described in the following documents:

EP-A-0 055 211
EP-A-O 230 137
U.S. Pat. No. 2,280,405
U.S. Pat. No. 3,007,295
U.S. Pat. No. 3,241,288
U.S. Pat. No. 4,106,265
GB-A-0 944 239
GB-A-1 281 964
GB-A-1 357 594, and
GB-A-1 381 369.

Up to now, packaging machines of the type specified above have been used primarily for wrapping generally flat products, that is, products with heights (this term meaning their dimensions in the direction in which the tubular wrapper is formed) much smaller than their lengths (this term meaning their dimensions in the direction in which the products advance through the packaging machine).

In this situation, provided that the operation of the two units is suitably synchronised (which can easily be achieved by known means), the distance between the regions in which the two closure units act in cascade is largely irrelevant as regards the quality of the final product.

Moreover, the distance in question can usually be made selectively adjustable so that it can be adapted—in large steps—to the dimensions (particularly the lengths) of the products being processed; in fact, the distance used, for example, to produce individual packages for small bars of chocolate will clearly not generally be the most suitable, for example, for forming multiple packages (so-called "multipacks") of piles of crackers or similar products.

The present Applicant's prior British patent application GB-A-9110185.5 addresses a problem which arises when quite "tall" products, that is, products of heights corresponding to considerable fractions (for example, $\frac{1}{3}$–$\frac{1}{2}$) of their lengths, are to be wrapped in flow-packs; for example, this is the case when packages contain biscuits or crackers piled vertically one upon another.

In fact, with such products, the closure of the wrapper upstream and downstream of the wrapped products may involve the application of a considerable tensile stress to the tubular wrapper. In particular, in some operative conditions (that is, for finished packages of a certain size) the two closure units disposed in cascade may operate on the wrapper simultaneously or almost simultaneously, resulting in the application of considerable longitudinal stress to the wrapper with the consequent risk, for example, that the seal formed by the upstream unit may reopen as a result of the separation of the portions of the tubular wrapper which were brought into contact with each other in the first closure unit, and with other possible adverse effects on the quality of the closure of the package as a whole.

In order to resolve this problem, the prior British application cited above proposes that the distance d between the two closure units which act in cascade be adjusted so as always to differ from the overall length 1 of the package and from multiples thereof.

The Applicant has now found that, in order to make best use of this solution in the automatic packaging of products such as food products, for example, confectionery products, it is necessary to take account of another very important factor and that is that, although the products processed are nominally identical, there may be quite considerable dimensional variations from one product to another.

This is the case, for example, with baked confectionery products (brioches, biscuits) or products based on baked products (for example, snacks with fillings, etc.) and, in general, with many products which are produced in batches, for which quite considerable variations in the dimensions of the product can be observed over a period of time in dependence on the different conditions under which the various batches are processed (for example, during rising).

This situation is shown schematically in FIGS. 1 and 2 of the appended drawings in which it can be seen that, although two nominally identical products P1, P2 (for example, baked products) have the same base dimension c measured in the direction in which the products advance through the automatic packaging machine, they may in fact have different heights H1 and H2 (for example, due to a different rising process).

For example, in a situation in which the length c is of the order of 7 cm, with products, such as, for example, biscuits, height variations (H2—H1) of even up to 6 mm may be found.

If the products P1 and P2 are inserted in nominally identical flow-packs F, that is, packs with end flaps of length a and so-called "bellows" of length b, it can be seen from a comparison of FIGS. 1 and 2 that this results in a considerable variation in the final length L1, L2 of the package (again measured in the direction of advance through the packaging machine) although the length of the portion of the tubular wrapper needed to wrap the products correctly, or at least in an acceptable manner, remains unchanged.

A packaging machine initially adjusted to operate on products of certain dimensions may thus, at least occasionally, be supplied with products which, although they are nominally identical to those for which the machine has been adjusted, in fact have different dimensions—due to various phenomena (for example, because they have undergone a different rising process) so that the packaging operation carried out is no longer suitable.

Naturally, the foregoing also applies to other possible variations in the dimensional characteristics of the products (length, width, etc. ...), although in the context of application described herein specific reference is made to height, which is considered to be the most important dimensional characteristic. The invention should not be considered to be limited solely to the possible monitoring of height or thickness.

The object of the present invention is to provide a packaging machine in which this problem can safely be prevented.

According to the present invention, this object is achieved by virtue of a packaging machine having the specific characteristics recited in the following claims. The invention also relates to a method of operating the machine.

In summary, the solution according to the invention provides for automatic monitoring (for example, by means of a photoelectric device) of the dimensions of the products to be packaged (for example, their heights) in order to identify any variations in those dimensions and for the phase difference in the operation of the two closure units then to be modified, also automatically (for example, by means of a differential device subservient to the signal produced by the photoelectric detector), for example, by a change in the timing of the operation of the downstream unit in relation to the timing of the operation of the upstream unit. Thus, the machine is adjusted constantly and automatically to the best operative conditions.

Figure 4:
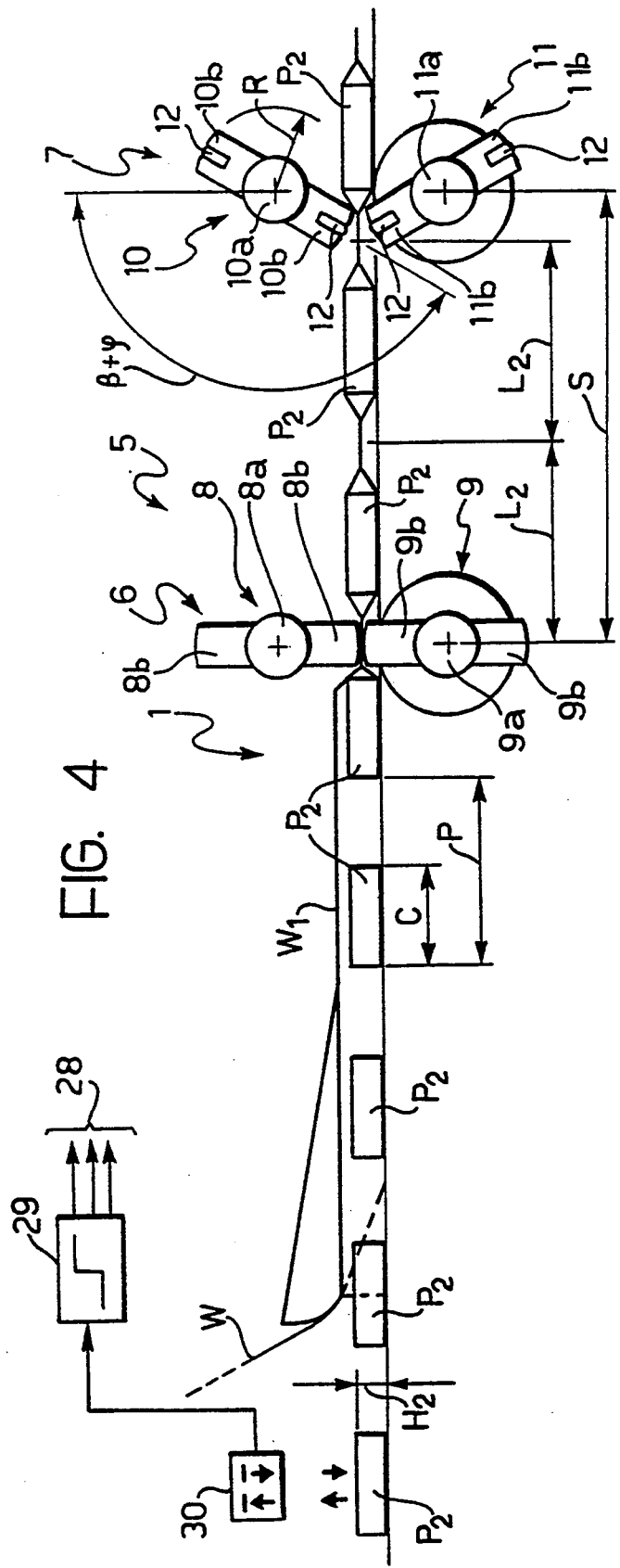
Figure 5:
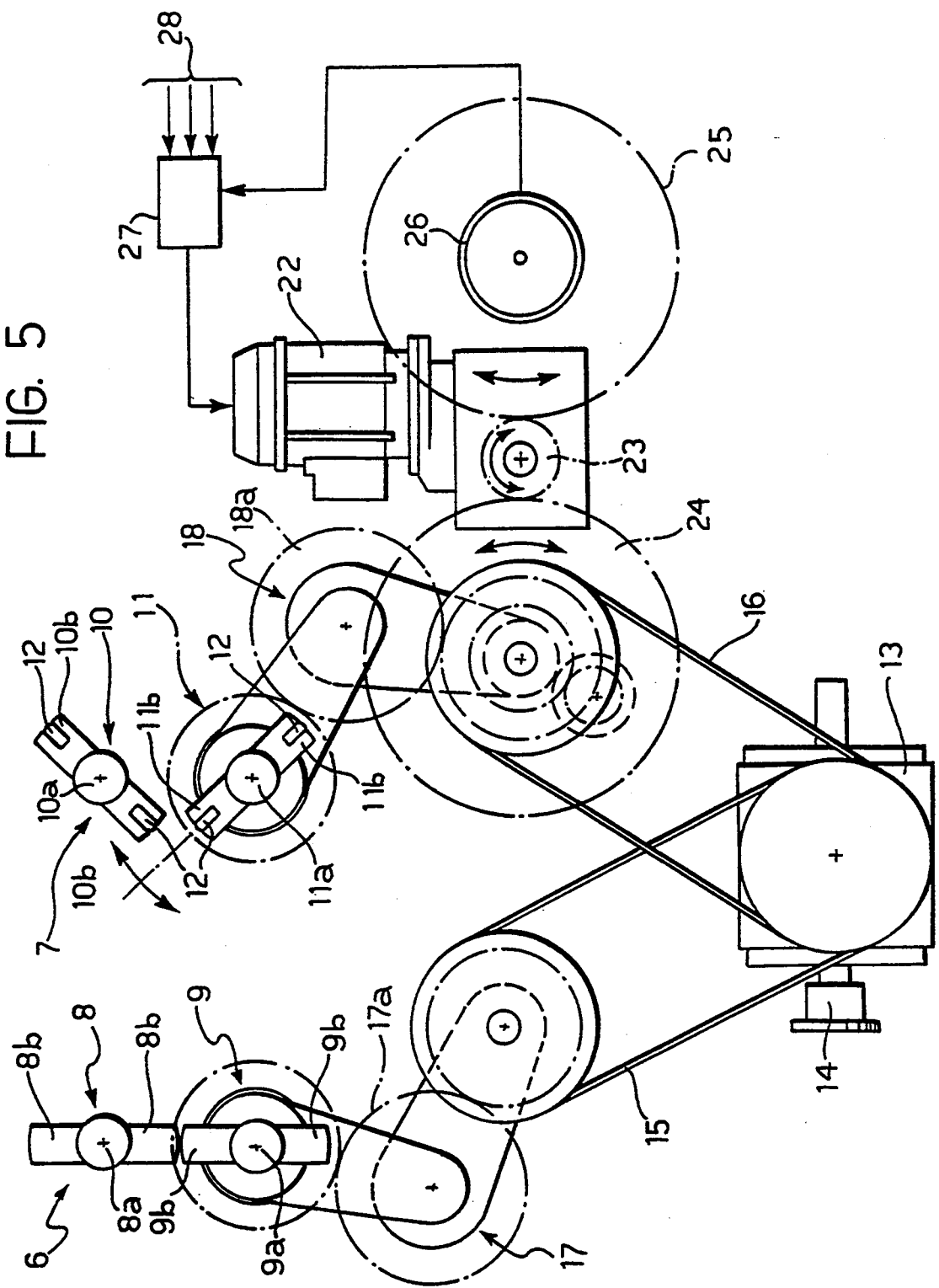
Figure 6:
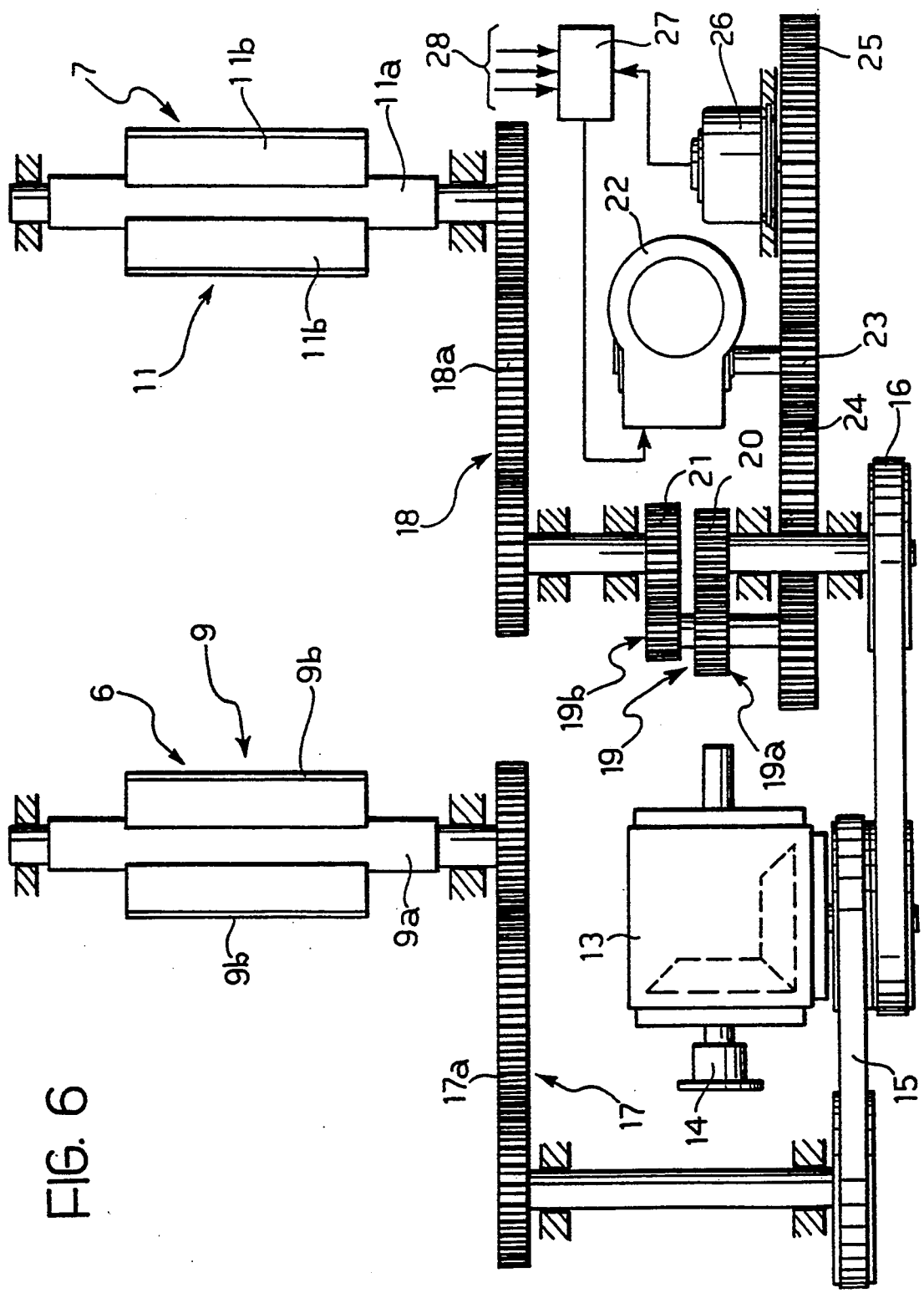

The invention will now be described, purely by way of non-limiting example, with reference to the appended drawings, in which:

FIGS. 1 and 2, which show the dimensional characteristics of the products processed, have already been described above with reference to the description of the technical problem upon which the invention is based, FIGS. 3 and 4 are schematic side elevations of a packaging machine operating according to the invention, showing two possible operating conditions, FIG. 5 is also a side elevation showing the device for operating the closure units of a machine according to the invention in greater detail, and FIG. 6 is a plan view of the elements shown in FIG. 5.

In FIGS. 3 and 4, the central portion of a packaging machine of the type currently known as a "flow-pack" or "ffs" machine, is generally indicated 1.

Machines of this type are widely known in the art as indicated, for example, by the documents cited in the introduction to the present description and, in particular, by U.S. Pat. No. 4 862 673.

The operating principles of the packaging machine 1 will not therefore be recited herein except insofar as they are necessary for an understanding of the invention.

By way of summary, it should be noted that the machine 1 is for forming packages of the type currently known as "flow-packs", each containing a respective product or group of products (so-called "multi-packs").

The packages are formed from a continuous flow of products P1, P2 (these different references indicating products which are nominally identical but which have different dimensions, particularly heights H1, H2), advancing from left to right with reference to the situation shown in FIGS. 3 to 6.

According to widely known criteria, a continuous tubular wrapper W1 is formed from a sheet W of plastics material or metal foil covered with a film of plastics material, which is unwound from a supply station (not shown in the drawings) by known means, not shown specifically, the products P1, P2 being fed (with reference to individual packages) into the tubular wrapper W1 spaced at regular intervals P-c (in which P represents the distance between homologous end edges—for example, the rear edges—of the products and c represents the lengths of the products, which are assumed to be constant).

The continuous tubular wrapper W1 with the products P1, P2 spaced regularly within it is advanced towards a closure station 5, the function of which is essentially to flatten the tubular wrapper in the spaces between two consecutive products, forming seal regions in the spaces for sealingly separating the individual products.

The wrapper then undergoes a sealing and cutting operation resulting in the formation of the individual packages F (FIG. 1, FIG. 2).

The closure station 5 has two units or assemblies 6, 7 with rotary jaws disposed upstream and downstream respectively in the direction in which the products P1 P2 advance through the machine 1 (from left to right).

The function of the upstream unit 6 is essentially to preform the seal region which is cut in the downstream unit 7.

The unit 6 includes two identical rotary jaws, an upper jaw 8 and a lower jaw 9. Each jaw includes essentially a shaft $8a$, $9a$ which is rotated by drive means (which will be described further below). One or more operative members $8b$, $9b$, are mounted on the shafts $8a$, $9a$ and carry associated heating elements, not shown.

In the specific embodiment, each jaw 8, 9 has two operative members $8b$, $9b$ mounted in diametrally opposite positions and having generally rounded free ends, possibly with grooves for gripping the wrapper.

In a substantially similar manner, the downstream unit has an upper jaw 10 and a lower jaw 11 each constituted by a rotary shaft $10a$, $11a$ on which are mounted respective operative members $10b$, $11b$, also having rounded free ends, associated heating elements, and grooves for gripping the wrapper.

In particular, the operative members $10b$, $11b$ of the downstream unit 7 carry associated cutting elements (blades) 12.

As stated, the function of the upstream unit 6 is essentially the preliminary formation of the seal region which is cut in the downstream unit 7. The seal region is formed by the squashing of the tubular wrapper W1 in the region between two successive products P1, P2 and the simultaneous heating of the wrapper to heat-seal the two portions of the wrapper W1 by pressing them together. The seal thus formed in the unit 6 is strengthened by the operative members $10b$, $11b$ in the downstream unit 7 and the cutting elements 12 simultaneously cut the seal region between successive products P1, P2, thus separating them into individual packages F (FIG. 1, FIG. 2).

The shafts of the rotary jaws of each unit (that is, the shafts $8a$, $9a$ of the jaws 8, 9 of the upstream unit 6 and the shafts $10a$, $11a$ of the jaws 10, 11 of the downstream unit 7) are interconnected, in known manner, by gearing (not shown specifically in the drawings) which rotates them in opposite senses. This results in orbital movements of the operative members $8b$, $9b$ (unit 6) and $10b$, $11b$ (unit 7) in opposite senses so that, from time to time, one of the operative members $8b$, $10b$ of the upper jaw 8 or 10 is lowered to cooperate with a rising operative member 9b, 11b of the lower jaw 9 or 11, clamping the wrapper W1 between the two jaws. In particular, the blades 12 of the operative members 10b, 11b contact each other and cut the wrapper W1 which has been softened as a result of the action of the heating elements of the jaws.

Moreover, it should also be stated that, although the present description relates to rotary closure units or assemblies, the solution according to the invention may also be used to advantage in packaging machines in which the closure units are of a different type, for example, with jaws or hammers which can move rhythmically downwards against underlying anvil portions.

The rotary movement of the units 6 and 7 (or, for precision, the movement in opposite senses of the rotary jaws constituting each unit 6, 7) is brought about by a main drive member 13 (FIGS. 5 and 6) usually constituted by a gear unit (for example, a pair of bevel gears) rotated by a main shaft 14 which in turn is connected to the drive members of the packaging line of which the machine forms part. This is in accordance with widely known criteria which do not need to be recited specifically in the present description.

The drive is transmitted from the drive member 13 to the units 6 and 7 by means of belt transmissions 15, 16 and further geared mechanisms 17, 18.

The latter usually include (again according to known criteria) at least one intermediate gear 17a, 18a which can move orbitally to and fro relative to the axes of the gears with which it meshes. The speeds of rotation of the units 6 and 7 are therefore not constant but are subject to a certain "oscillation" so that, during the period in which the operative members 8b, 9b, 10b, 11b are in contact with the film W1, their speed conforms to the speed of advance of the wrapper or film W1 through the packaging machine. This is in accordance with criteria widely known in the art; for a description of some possible solutions for causing the speed of rotation of the operative members in question to oscillate, reference may usefully be made to the present Applicant's British application GB-A-9110086.7

In the case of the downstream unit 7, a differential mechanism 19 (or a functionally equivalent control gearing) interposed between the belt transmission 16 and the mechanism 18 for causing the oscillation in the speed of rotation of the jaws 10 and 11 transmits the rotary motion between the output shaft (the gear 20 of FIG. 6) of the belt transmission 16 and the input shaft (the gear 21 of FIG. 6) of the mechanism 18 for causing the oscillation in the speed of rotation of the downstream unit 7. If the differential 19 is acted on, for example, by an electric motor 22 with a pinion 23 keyed to its output shaft, the angular position of the gear 21 can be varied relative to that of the gear 20 by the algebraic sum of two movements.

In particular, the pinion 23 meshes on one side with a gear 24 which rotates the gears 19a, 19b around the drive gear 20 and the driven gear 21 and on the other side with a further gear 25 which is keyed to the shaft of an angular position sensor (a so-called encoder) 26.

An automatic control device (for example, a so-called PLC) is indicated 27. Most commonly, the control device 27 is actually constituted by a function of the general control device which regulates the operation of the machine 1 as a whole.

The device 27 is connected to the motor 22 and to the encoder 26 in a general feedback-control configuration. In other words, the device 27 can rotate the motor 22 to a certain angular position of its rotary movement (thus causing a corresponding angular movement of the gearing 19 and hence of the phase relationship between the gears 20 and 21) and can check that this command has been carried out by means of a feedback signal from the encoder 26 which is sensitive to the rotation of the pinion 23.

The device 27 is also supplied, on a set of lines indicated 28, with the output signal of a threshold circuit 29 (which may also be constituted by one of the functions of the general control system of the packaging machine) which in turn is sensitive to the output signal of a photoelectric detector 30. This is disposed on the path of advance of the products P1, P2, upstream of the position in which the units 6 and 7 close the tubular wrapper W1.

The detector 30 has the function of monitoring the thicknesses (that is, in practice, the heights H1, H2) of the products advancing towards the closure units 6 and 7 and emitting a corresponding monitoring signal for supply to the threshold circuit 29 which identifies the level of the signal.

This can be achieved according to known criteria which do not need to be described in detail herein. For example, the detector 30 may include several infra-red emitter-receiver pairs disposed at different heights above the plane along which the products P1, P2 travel. In this case, in order to detect the heights H1, H2 of the products P1, P2, it is observed in which of the pairs the receiver is struck by the radiation from the corresponding emitter and in which pairs the flow of products P1, P2 passing between the emitter-receiver pairs prevents the radiation being transmitted between the emitter and the receiver. Alternatively, the photodetector 30 may be constituted by a laser photoelectric gate such as the detector sold by the Keyence Corporation-Japan, under the trade name LX-130.

Alternatively, the heights of the articles P1, P2 could be detected by other means, for example, by ultrasound detectors or (although less conveniently and effectively) by mechanical detectors.

In this connection, it should also be pointed out that, for the purposes of putting the invention into practice, it is not so important to identify precisely the height of each individual product P1, P2 to be wrapped as to be able to identify variations in the dimensions (typically the heights of the products) which consistently affect a whole group or batch of food products supplied to the units 6 and 7 one after another.

In practice, returning to the example of baked products given in the introduction to the present description, it seems important to be able to identify a situation which occurs, for example, when, after the packaging machine has been supplied with a batch of products all of a certain height (or all of heights within a very limited range of variation), the machine is supplied with another batch of products which (for example, since they have been made to rise under different conditions from the products of the previous batch) are of consistently larger or smaller average height than the products of the batch processed previously.

For this purpose, the threshold device 29 is preferably formed so that it can discriminate between distinct bands or ranges of height values (selection in steps).

As a practical example, the comparator circuit 29 could be formed essentially as a comparator with two thresholds which jointly define a window: for example, for products with expected heights of 2 cm, a window between an upper threshold of 2.1 cm and a lower threshold of 1.9 cm.

The distance between the units 6 and 7 can thus be adjusted (together with the phase difference in the operation of the units 6 and 7) so that products whose heights fall precisely in the centre of the band of values, that is, those having the expected nominal value, are processed in an optimal manner. In determining the width of the band (that is, the gap between the two thresholds) account can thus be taken of the fact that, although the machine is adjusted to operate in an optimal manner for products of a certain height, it can nevertheless also process products whose heights differ within certain limits from the average for which the machine has been adjusted so as to function in an optimal manner. These limits thus define the width of the window defined and, in practice, the locations of the thresholds of the threshold circuit 29. These thresholds thus correspond to limit values of the detection signal of the photo-detector 30 such that, if the heights of the products are above (in the case of the higher threshold of the window) or below (in the case of the lower threshold of the window) the respective limit value, it is necessary automatically to adjust the phase difference in the operation of the two units 6 and 7.

The way in which this takes place (and the meaning of the term "phase difference in the operation" as used in the present description and—where appropriate—in the following claims) will now be described with specific reference to FIGS. 3 and 4.

Considering FIG. 3 first of all, it is assumed that the machine has been adjusted initially to operate in an optimal manner on products P1 of height H1 and the phase difference in the operation of the units or assemblies 6 and 7 is identified by an angle beta. This means that, when the upstream unit 6 is instantaneously in the closure position (with two homologous operative members 8b, 9b closing the wrapper W1 between them), the downstream unit or assembly 7 is instantaneously in an angular position in which the plane in which its operative members 10b are aligned (that is, the plane of the blades 12 of the upper jaw 10) is inclined at an angle beta to the vertical. Naturally, this situation (which corresponds to a specular orientation of the operative members 11b of the lower jaw 11) may also be identified by an angle supplementary to the angle beta; the selection in fact makes no difference.

Now, if the machine 1 were unexpectedly supplied (for example, as a result of the arrival of a new batch of products) with products P2 (which were nominally the same as the products P1 but were in fact of a lesser height H2) the machine 1 would start to function unsatisfactorily in the sense that the jaws 10 and 11 would tend, so to speak, to arrive too late in the sealing regions just produced in the sealing unit 6, with the result that they would fail to strengthen the seal.

In order to re-establish the correct operation of the machine, it is therefore necessary to alter the timing of the operation of the downstream unit 7 so as to advance the movement of the jaws 10 and 11 somewhat in comparison with the situation described above. This situation is shown in FIG. 4, which shows the jaws 10 and 11 of the downstream unit in angular positions defined by a phase angle $(\beta + \phi)$ in which $\phi$ defines the necessary phase correction, again with reference to the operating condition described above, that is, at the moment when the jaws 8 and 9 of the upstream unit 6 are closed onto the wrapper W1.

This is achieved by means of the photodetector 30 the output signal of which is indicative of the heights of the products, the circuit 29 discriminating between levels of the signal. The circuit 29 acts on the gearing 19 by means of the motor 22 so as correspondingly to vary the phase difference the rotation of the gears 20 and 21 in dependence on the level of the detection signal received on the lines 28 and compared with the threshold.

In particular, if the radius of the path of rotation of the free ends of the jaws 10, 11 (in practice the radius—in meters—of the paths of rotation of the blades 12) is indicated R, it can be shown that the phase increment $\phi$ of FIG. 2 is related to the variation in the overall length (L1, L2) of the package F by a law of direct proportionality of the type:

$$\frac{2\pi R}{360} \cdot \phi = 2(L2 - L1)$$

In this formula L1 and L2 indicate the overall lengths of the packages F as shown in FIGS. 1 and 2.

It can clearly be seen that this length is shorter for the taller products P1 than for the less tall products P2.

Conversely, if the products processed by the machine 1 were to be taller than the height H1, the overall lengths of the packages F would decrease necessitating a correction in the opposite sense, that is, a decrease in the phase angle $\beta$ (by a negative angle).

In practice, according to a solution which has been found wholly satisfactory from a functional point of view, the device 27 can be programmed (in known manner) so that:

the motor 22 (and hence the gearing 19) is kept in the operating position corresponding to the phase difference between the two units 6 and 7 which is optimal for processing products of heights corresponding to the expected nominal value, as long as the height detected by the sensor 30 falls within the window defined by the thresholds of the comparator 29, and the device 27 operates the motor 22 and consequently the gearing 19 so as to bring about the necessary variation ($\phi$) of the phase difference in the operation of the units 6 and 7 in the sense of an increase (advance) or a decrease (retardation) when the heights of the products processed fall below the lower threshold of the device 29 or rise above the upper threshold of the device 29, respectively.

A mechanism is thus put into effect for adjusting the phase difference in steps corresponding to the detection, also in steps, of variations in the dimensions (the heights H1, H2) of the products.

Moreover, although the phase-correction values for advance and retardation respectively are preferably identical, they could naturally differ in dependence on specific requirements of use.

Similarly, one could consider simplifying the detection mechanism described above by using a single threshold and hence only one possible phase correction (for example, if any variations in the dimensions of the products processed from those expected were to be able to take place in only one direction) or the mechanism could be refined even further (for example, with the use of three or more detection thresholds in the device 29 and, correspondingly, three or more possible phase corrections by the motor 22 and the gearing 19).

In principle, one could also consider making the detection of the dimensional variations of the products and the correction of the phase difference in the operation of the units 6 and 7 theoretically continuous so that adjustments could be made for dimensional variations of individual products. This solution, which involves the need to ensure very rapid phase correction and exact synchronisation between the detection and the phase correction so as to carry out, for each product, any phase correction imposed by the dimensional characteristics of that product, is generally of limited interest, at least in the context of use to which the present description relates. As has been seen, in this context, which is considered by way of example, the need is primarily for adjustment to variations which develop slowly and may occur between successive batches of products supplied to the machine.

Moreover, it should be noted that the correction mechanism described above relates essentially to a phase difference, meaning the relative angular positions of two rotary units or assemblies with jaws. The same solution may, however, also be adapted for closure units including jaws which operate intermittently (for example, with vertical movements like a guillotine); in this case, the term "phase difference in the operation" should be interpreted as the period of time between successive operations of the two closure units or assemblies 6, 7 on the same sealing region of the wrapper W1, all in relation to the interval between two successive operations of the same unit or assembly 6, 7 which is identified by the "module" corresponding to the individual product processed.

Moreover, in order to vary the phase difference in the operation of the two units or assemblies 6, 7, one could in theory consider changing the timing of the upstream closure unit 6 rather than that of the downstream unit (as in the embodiment illustrated).

Naturally, the principle of the invention remaining the same, the details of construction and forms of embodiment may be varied widely with respect to those described and illustrated, without thereby departing from the scope of the present invention.

What is claimed is:

1. A packaging machine in which products to be packaged are inserted in a tubular wrapper which is then closed by at least two closure units disposed in series in the general direction in which the products advance, comprising:
   a detector for detecting at least one dimensional characteristic of the products before they are supplied to the closure units, said detector being able to generate at least one signal indicative of the dimensional characteristic, and
   adjustment means which are sensitive to the at least one signal and can selectively vary the phase difference in the operation of the two closure units dependent on the signal generated by said detector.

2. A machine according to claim 1, wherein the closure units are of the type with contrarotating jaws.

3. A machine according to claim 1 wherein the adjustment means vary the phase difference in operation by changing the timing of the operation of the closure unit which is situated downstream in the general direction in which the products advance.

4. A machine according to claim 1, wherein the at least one dimensional characteristic is constituted by the heights of the products.

5. A machine according to claim 1, wherein the adjustment means include a control gearing which controls the transmission of the drive to at least one of the closure units.

6. A machine according to claim 1 or claim 5, wherein the adjustment means include a motor which can selectively change the timing of the operation of at least one of the closure units, and associated feedback means carried by the motor for checking that the command to change the timing of the operation of the at least one of the closure units has been put into effect.

7. A machine according to claim 6, wherein the feedback means comprise an optical encoder which is subservient to the motor.

8. A machine according to claim 5, wherein the adjustment means act on one of the drive shafts of the gearing.

9. A machine according to claim 1, further comprising common drive means for driving the closure units and respective chains for transmitting the drive from the drive means to the closure units, and wherein the adjustment means operate on one of said transmission chains.

10. A machine according to claim 1, wherein said detector is arranged to detect discrete values of the variations in the at least one dimensional characteristic and the adjustment means cause corresponding discrete changes in the phase difference in the operation of the two closure units.

11. A machine according to claim 10, wherein said detector is associated with a threshold circuit which can generate signals at respective distinct levels dependent on the value of the at least one dimensional characteristic in comparison with a predetermined threshold value.

12. A machine according to claim 10, wherein said detector and the adjustment means carry out their respective detection and adjustment functions in relation to at least three discrete values.

13. A machine according to claim 1, wherein said detector includes at least one photo detector which is sensitive to at least one dimensional characteristic of the products.

14. A machine according to claim 1, wherein said detector includes a sensor element situated generally above the products which are advancing towards the closure unit.

15. A method of operating a packaging machine, in which products to be packaged are inserted in a tubular wrapper which is then closed by at least two closure units disposed in series in the general direction in which the products advance, comprising the steps of:
   detecting at least one dimensional characteristic of the products before they are supplied to the closure units and generating a signal indicative of the dimensional characteristic; and
   selectively varying the phase difference in the operation of the closure units dependent on the generated signal.

16. A method according to claim 15, applied to a packaging machine in which a variation in the at least one dimensional characteristic causes a variation in the overall length, measured in the general direction in which the products advance, of the wrapper formed as a result of the closure of the tubular wrapper by the closure units, wherein the phase difference in the operation of the closure units is varied according to a law of proportionality in relation to variations of the overall length caused by variations of the at least one dimensional characteristic.

17. A method according to claim 16, applied to a packaging machine in which the closure units are of the type with contrarotating jaws with a given radius of rotation, wherein the variation of the operating phase difference is related to the variation of the overall length by an equation of the type:

$$\frac{2\pi R}{360} \cdot \phi = 2(L2 - L1)$$

in which:

$\phi$ is the variation imposed on the operating phase difference, R is the given radius of rotation, and (L2−L1) is the variation of the overall length.

18. A method according to claim 15 wherein discrete values of the variations of the at least one dimensional characteristic are detected and the phase difference in the operation of the closure units is correspondingly varied by discrete quantities.

* * * * *